United States Patent
Brunner

[11] Patent Number: 5,964,909
[45] Date of Patent: Oct. 12, 1999

[54] FILTER CARTRIDGE SEALING METHOD

[76] Inventor: David Brunner, 75 Mary Street, Milton, Ontario, Canada, L9T 1L6

[21] Appl. No.: 09/148,140

[22] Filed: Sep. 4, 1998

[51] Int. Cl.⁶ ..................................................... B01D 29/21
[52] U.S. Cl. ................................ 55/377; 55/378; 55/379; 55/498; 55/502; 210/450; 210/473; 210/474
[58] Field of Search ............................... 55/377, 378, 379, 55/498, 502; 210/450, 473, 474

[56] References Cited

U.S. PATENT DOCUMENTS 5,730,766   3/1998   Clements ................................... 55/502

FOREIGN PATENT DOCUMENTS

000601733 A1   6/1994   European Pat. Off. ................. 55/502
373 020   12/1973   Russian Federation ................. 55/502

OTHER PUBLICATIONS

Buckingham, Flexible Filter Element, IBM Technical Disclosure Bulletin, vol. 4, No. 7, Dec. 1961.

*Primary Examiner*—Jay H. Woo
*Assistant Examiner*—Minh-Chau T. Pham

[57] ABSTRACT

The present invention is directed to a filter cartridge that provides for a secure dust tight seal and is easily inserted and removed from a filtration unit. The filter cartridge includes a cartridge unit having a filter element, a bottom cap and a top boot and a sealing sleeve for insertion into the interior of the top boot. The top boot has an outside diameter which is slightly smaller than the inside diameter of the opening in a tube sheet into which the filter cartridge is to be inserted so that the cartridge may be easily inserted into and removed from the opening in a tube sheet. The top boot is also provided with a sealing ridge, which is located in the inside of the boot at the sealing point. The inside diameter of the sealing ridge is smaller than the cartridge boot and the sealing sleeve. When the sealing sleeve is inserted into the cartridge boot, the sealing sleeve contacts the sealing ridge and causes an increase in diameter of the sealing ridge. This in turns causes the sidewall of the cartridge boot to balloon outwardly to contact the side of the opening in a tube sheet and form a dust tight seal around the opening in the tube sheet into which the filter cartridge is inserted. To remove the cartridge from the unit the sealing sleeve is removed from the cartridge and than the cartridge is easily lifted out of the unit.

11 Claims, 4 Drawing Sheets

INSERT CARTRIDGE INTO TUBESHEET.

PUSH DOWN SO FILTER RESTS ON FILTER BOOT'S OUTER RIM.

INSERT SEALING SLEEVE

REMOVE SEALING SLEEVE FOR REMOVAL.

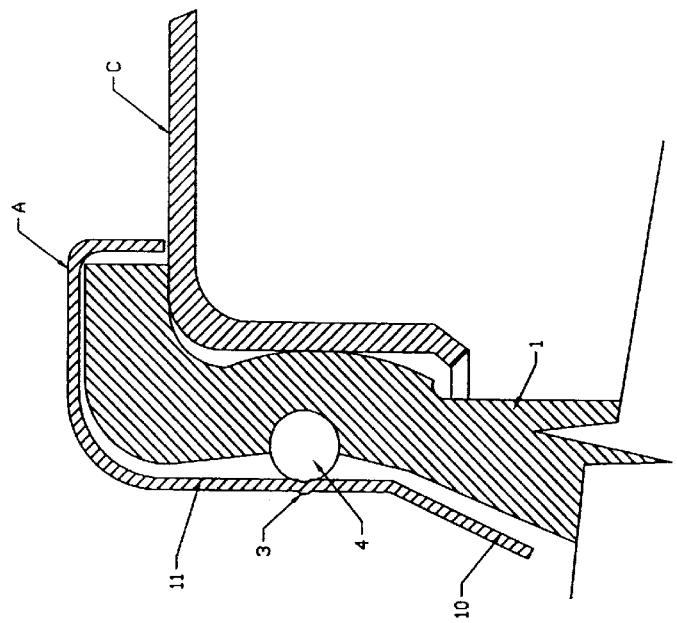
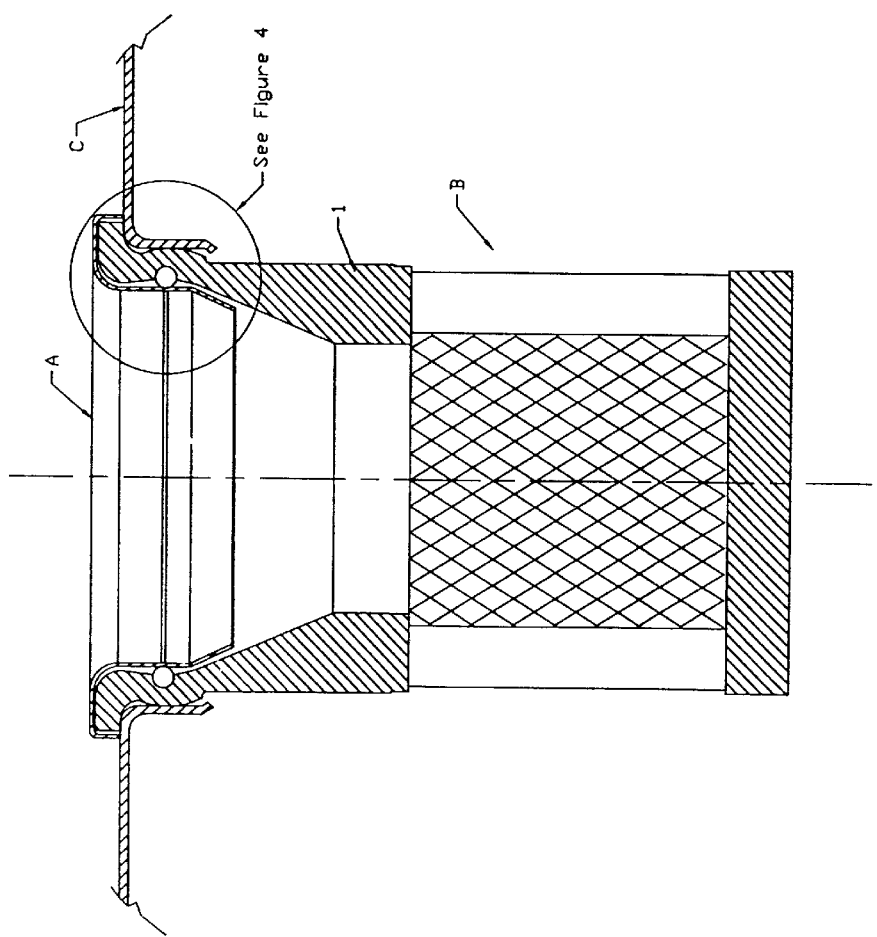
Figure 4
Figure 3

FILTER CARTRIDGE SEALING METHOD

FIELD OF THE INVENTION

The present invention relates to cartridge filters, and in particular to a means of sealing the cartridge filters.

BACKGROUND OF THE INVENTION

Improvements in air quality through reduction of air born pollutants has become increasingly important. One of the most common methods of controlling air pollutants in industry is the use of fabric filtration. The most widely accepted system for controlling air pollution is the baghouse which has the same operating principle as a vacuum cleaner. In a baghouse or vacuum cleaner, dirty air is drawn into the unit with a blower or fan, the dirt is collected on the filtering media and clean air is then discharged from the system. The collected dirt is then removed from the system and disposed. Baghouses typically employ a tubular bag as the filtering element. In this type of system one end of the tubular bag is closed while the other end is sealed into a tube sheet. The tube sheet is the part in the baghouse which provides a physical barrier between the sections of the baghouse containing the dirty air stream and the clean air stream. In order to maintain this physical separation, the filter element must be sealed to the tube sheet to prevent passage of dirt through the seal. Various methods have been proposed to seal the tubular bag into the tube sheet. The two most common methods are the use of a snap ring or a common hose clamp.

Recent advancements in cartridge filter media have led to the replacement of the baghouse tubular bags with cartridge filters. In order for the cartridge filter to perform at its peak collection efficiency, the cartridge seal must be dust tight. Cartridge filters also require occasional replacement or removal for inspection and to facilitate the removal of the cartridges for inspection or replacement, this dust tight seal must be easily broken. Since cartridge filters are a rigid structure and not flexible like a filter bag, providing a dust tight seal between the cartridge and tube sheet as well as providing a method for easy removal of the cartridge presents a problem and there have been many solutions presented.

Earlier attempts at sealing the cartridges into the tube sheet utilized sections of the tubular bags. In one design the top of the tubular bag, or "cuff" as it is more commonly known, was cut off and sealed into the tube sheet as it normally is. A cartridge dust tight seal was achieved by mounting a metal tube with an outside diameter, which is slightly larger than the inside diameter of the cuff onto the top of the cartridge and then pushing the cartridge into the cuff. This system did provide a dust tight seal; however, it was very labor intensive to install and costly to manufacture. An alternate design utilized a rubber boot, which was attached to the top of the cartridge with a hose clamp. The opposite end of the boot was than attached to the tube sheet with a hose clamp. This system did provide a dust tight seal; however, it is very labor intensive to install.

Another sealing method was proposed in U.S. Pat. No. 5,632,791. In this design the upper sleeve of the cartridge is formed of a flexible material which has a slightly larger outside diameter than the inside diameter of the hole in the tube sheet. To insert the cartridge into the tube sheet the upper sleeve is deformed, typically into a figure "8", the cartridge is placed into the hole in the tube sheet and then the sleeve is allowed to relax. The dust tight seal is achieved because the sleeve's outer dimensions are slightly greater than the opening in the tube sheet so that the top sleeve is slightly compressed when the sleeve is snugly fit into the opening in the tube sheet. This design relies on the resilience of the material in the flexible sleeve to provide a dust tight seal. In most cases an adequate seal is provided however, if there are any changes in the physical characteristics of the flexible sleeve due to aging, temperature or chemical attack, the seal could be compromised. Removal of this design of cartridge can be very difficult since the sleeve must be deformed in order to break the seal.

There thus remains a need for a means of securing and sealing a cartridge filter to a tube sheet to provide for both a dust tight seal and easy removal of the cartridge filter for inspection and replacement.

SUMMARY OF THE INVENTION

The present invention is directed to a filter cartridge that provides for a secure dust tight seal and is easily inserted and removed from a filtration unit. The filter cartridge comprises a cartridge unit having a filter element, a bottom cap and a top boot and a sealing sleeve for insertion into the interior of the top boot. The top boot has an outside diameter which is slightly smaller than the inside diameter of the opening in a tube sheet into which the filter cartridge is to be inserted so that the cartridge may be easily inserted into and removed from the opening in a tube sheet. The top boot is also provided with a sealing ridge, which is located in the inside of the boot at the sealing point. The inside diameter of the sealing ridge is smaller than the cartridge boot and the sealing sleeve. When the sealing sleeve is inserted into the cartridge boot, the sealing sleeve contacts the sealing ridge and causes an increase in diameter of the sealing ridge. This in turns causes the sidewall of the cartridge boot to balloon outwardly to contact the side of the opening in a tube sheet and form a dust tight seal around the opening in the tube sheet into which the filter cartridge is inserted. To remove the cartridge from the unit the sealing sleeve is removed from the cartridge and than the cartridge is easily lifted out of the unit.

BRIEF DESCRIPTION OF THE DRAWINGS

A preferred embodiment of the present invention is illustrated in the attached figures in which:

FIG. 3 is a cross sectional view of the filter cartridge and sealing sleeve of FIG. 1 installed in a tube sheet;

FIG. 4 is a detailed cross section of the sealing action when the sealing sleeve is inserted into the filter cartridge of FIG. 1.

DETAILED DESCRIPTION OF THE PREFERRED EMBODIMENTS

A preferred embodiment of a cartridge filter according to the present invention is illustrated in FIGS. 1 to 5. The cartridge filter has a cartridge B and a sealing sleeve A. The cartridge filter is adapted to be inserted into an opening in a section of tube sheet C, which is commonly used in dust collectors. The opening in the tube sheet C has an inside diameter of D1.

Figure 1:
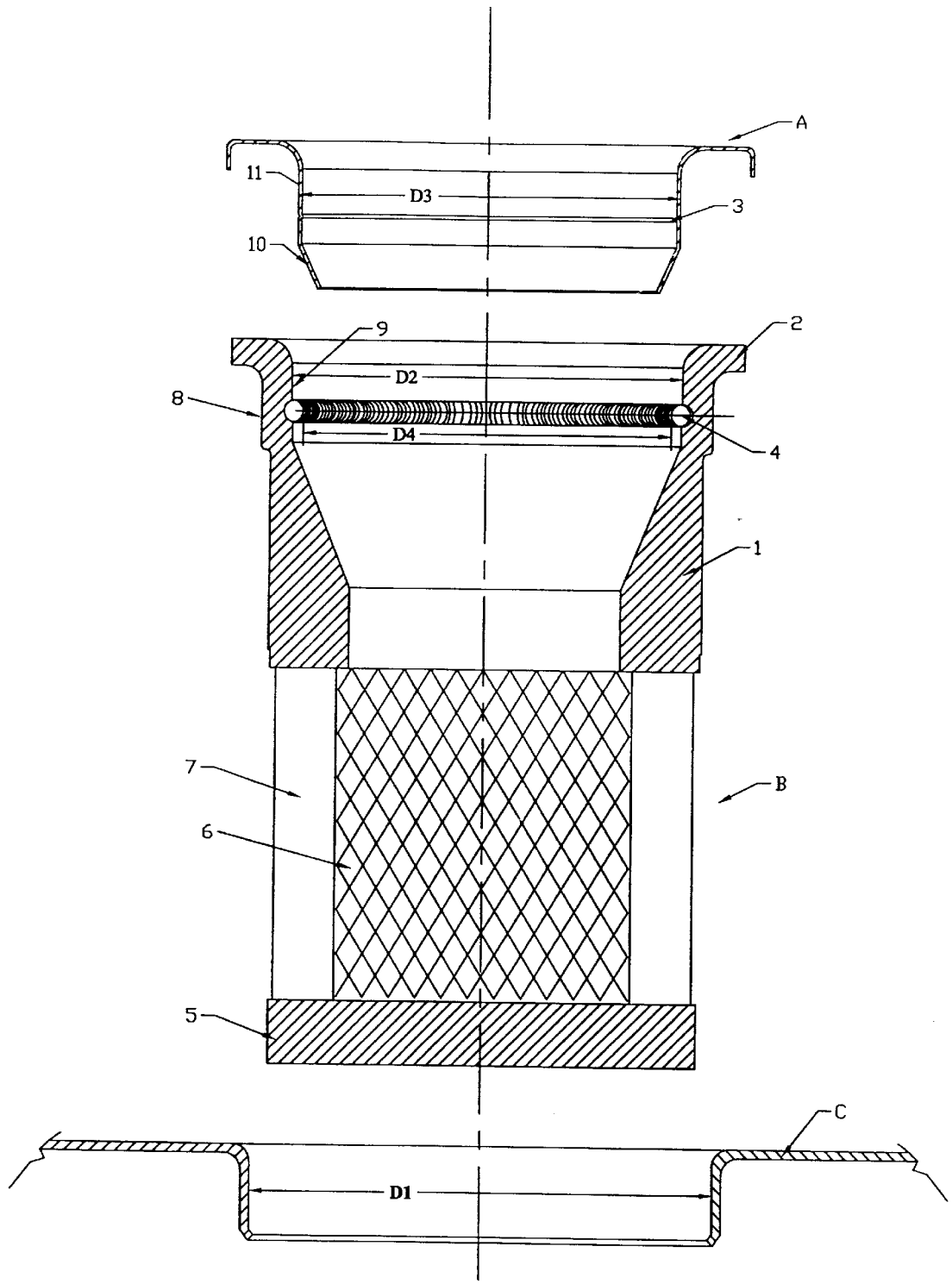
FIG. 1 is an exploded cross sectional view of a preferred embodiment of a filter cartridge and sealing sleeve of the present invention for installation in a typical tube sheet.

A section of a typical cartridge B and sealing sleeve A is illustrated in FIG. 1. The cartridge is typically constructed of a bottom cap 5, inner core 6, pleated filter media 7 and top boot 1.

The bottom cap 5 provides an air tight seal for the bottom of the cartridge B and can be made of any sealing material. For instance, the bottom cap 5 can be made of urethane, polyurethane, fluorocarbons, silicone compounds or metal caps sealed to the bottom of the cartridge B. The inner core 6 provides structural support for the cartridge B. It is generally tubular in shape, runs the full length of the cartridge B and is embedded into the top boot 1 and bottom cap 5. The inner core 6 can be made of any porous material such as expanded metal, plastic or metal screening.

The pleat pack 7 may be constructed of any conventionally known filtering media. In most cases the filter media is pleated and runs the full length of the cartridge filter B.

The top boot 1 may be constructed of urethane, polyurethane, fluorocarbons, silicone compounds and the like so long as the material forming the top boot 1 is flexible and will expand outwards when the sealing sleeve A is inserted into it as will be described further below. Beginning at the top, the cartridge boot includes an outer rim 2 extending radially outward beyond an outer wall 8 to provide support for the cartridge B when it is inserted into the opening in the tube sheet C. The outer wall 8 is constructed so that it can be easily inserted into the opening of the tube sheet C. The outer wall 8 has an outside diameter, which is less than the inner diameter D1 of the opening of the tube sheet C and a contour that allows it to fit into the opening of the tube sheet C. The inner wall 9 adjacent the outer rim 2 has an inside diameter D2 which is greater than the outside diameter D3 of the sealing sleeve A. This allows for easy insertion of the sealing sleeve A into the opening of the top boot 1. An integral part of the top boot 1 is a sealing ridge 4 located at the point of sealing. The sealing ridge 4 can be made of any material so long as it provides for an expansion of the outside diameter of the wall of the top boot 1 when the sealing sleeve A is inserted into the top boot 1. Some typical materials are a spring, urethane, molded rubber, silicone etc. The sealing ridge 4 has an inside diameter of D4.

The sealing sleeve A is a rigid part that can be made of metal, plastic or the like. Beginning at the bottom, the sealing sleeve includes a tapered section 10 that assists in expanding the sealing ridge 4. The outer wall 11 has an outside diameter D3 that is larger than the inside diameter D4 of the sealing ridge 4 and generally conforms to the contour of the inside of the filter boot 9. The outside diameter D3 of the sealing sleeve is such that when it is inserted into the filter boot 1 the outer wall 11 expands the boot sealing ridge 4 and in turn bulges the boot's outer wall 8 to provide a seal against the tube sheet C, as shown in FIG. 3 and FIG. 4. A locking recessed groove 3 is located on the outer wall 11. This locks the sealing sleeve A into the cartridge B when the sealing sleeve A is inserted into the cartridge B.

Figure 2:
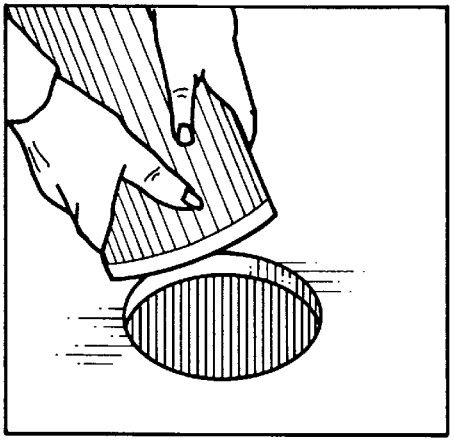
FIG. 2 is a sequence of drawings, which illustrates the installation and removal procedure for the filter cartridge of FIG. 1.
Figure 2:
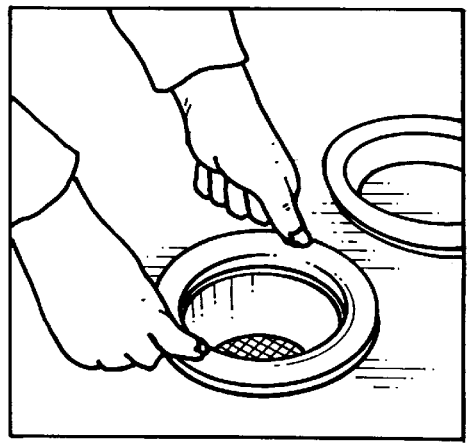
Figure 2:
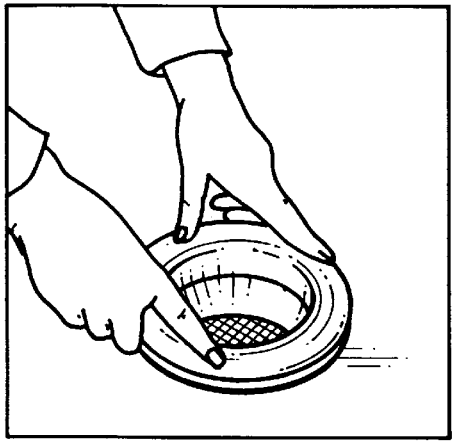
Figure 2:
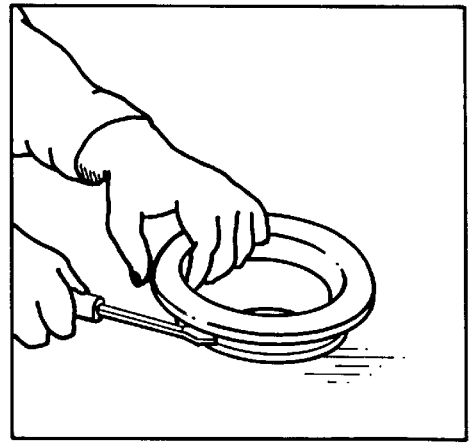

With reference to the drawings in FIG. 2 and the cross sectional view in FIG. 1, the installation procedure is as follows. A filter cartridge B is placed into the tube sheet C, the filter is pushed down so that the filter boot's outer rim 2 rests on the tube sheet C. The sealing sleeve A is then inserted into the cartridge B and pushed down into the interior of the cartridge. As the sealing sleeve is pushed into the cartridge the sealing ridge is contacted by the lower tapered section, causing the sealing ridge 4 to expand in diameter as the sealing sleeve continues to enter the cartridge. The expansion in the diameter of the sealing ridge in turn causing the outside diameter of the top boot in the region of the sealing ridge to increase, bulge outward and come into contact with the tube sheet C. The sealing sleeve is pushed into the cartridge until the sealing ring snaps into the sealing sleeve locking ring 3. The filter is now sealed at the contact point between the tube sheet and filter boot.

To remove the cartridge from the unit, the seal is first broken by removing the sealing sleeve A, and then the cartridge B is pulled out of the unit.

Figure 5:
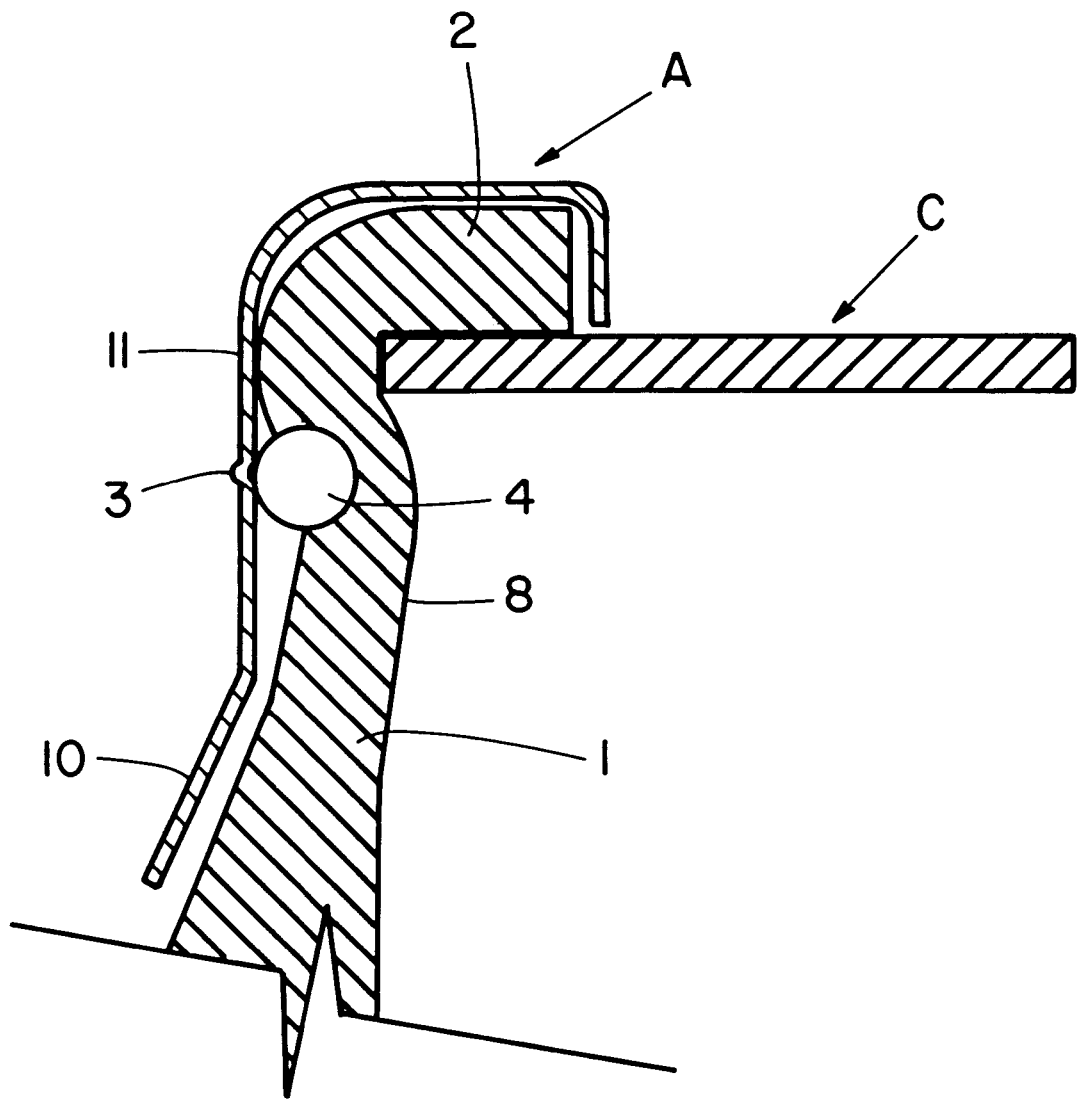
FIG. 5 is a detailed cross section of the filter cartridge and sealing sleeve of FIG. 1 installed in an alternate tube sheet arrangement.

A variation of the opening in the tube sheet is illustrated in FIG. 5. The opening in the tube sheet is a punched hole as opposed to a drawn cup of the opening illustrated in FIGS. 1 to 4. In this case the sealing ridge would be located just below the tube sheet. In this design the outer wall of the cartridge boot would bulge out just below the tube sheet and it would form a lock and seal at this point.

In the preferred embodiments illustrated, the sealing ridge is shown as a separate element; however the same effect could be obtained by molding any flexible material into the boot. For example, a radial ridge could be molded out of the same material as the boot and it will give the same effect as the spring, as illustrated in all of the figures.

The present invention provides for an improved filter cartridge having a secure dust tight seal while being easily inserted and removed from a filtration unit. The top boot of the cartridge unit with an outside diameter slightly smaller than the inside diameter of the opening in a tube sheet into which the filter cartridge is to be inserted provides for a filter cartridge which may be easily inserted into and removed from the opening in a tube sheet. The contact between the sealing sleeve and the sealing ridge causes an increase in diameter of the sealing ridge and the sidewall of the cartridge boot to result in the sidewall ballooning outwardly to contact the side of the opening in a tube sheet and form a dust tight seal around the opening in the tube sheet into which the filter cartridge is inserted. The cartridge is easily removed from the unit by removing the sealing sleeve from the cartridge and then the cartridge is easily lifted out of the unit.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A filter cartridge having a secure dust tight seal and being easily inserted and removed from an opening in a tube sheet of a filtration unit, the filter cartridge comprising a cartridge unit having a filter element, a bottom cap and a top boot constructed of a flexible material, and a rigid sealing sleeve for insertion into the interior of the top boot, the top boot having an outside diameter which is slightly smaller than the inside diameter of an opening in a tube sheet into which the filter cartridge is to be inserted so that the cartridge is easily inserted into and removed from the opening in a tube sheet, the Lop boot further having a sealing ridge, located in the inside of the boot at the sealing point, the inside diameter of the sealing ridge being smaller than the top boot and the sealing sleeve, whereby when the rigid sealing sleeve is inserted into the top boot, the said sealing sleeve contacts the sealing ridge and causes an increase in diameter of the sealing ridge which in turn causes the side wall of the top boot to balloon outwardly to contact the side of the opening in a tube sheet and form a dust tight seal around the opening in the tube sheet into which the filter cartridge is inserted.

2. A filter cartridge according to claim 1 wherein the side wall of said top boot is constructed of a flexible material selected from the group consisting of urethane, fluorocarbons or silicone compounds.

3. A filter cartridge according to claim 2 wherein said rigid sealing sleeve is made of plastic or metal.

4. A filter cartridge according to claim 1 wherein said top boot comprises an outer rim extending radially outward beyond said side wall to provide support for the cartridge when it is inserted into the opening in a tube sheet wherein the side wall has an outside diameter, which is less than the inner diameter of the opening of the tube sheet and a contour that allows it to fit into the opening of the tube sheet.

5. A filter cartridge according to claim 4 wherein the side wall of said top boot adjacent the outer rim has an inside diameter which is greater than the outside diameter of the sealing sleeve.

6. A filter cartridge according to claim 1 wherein said sealing ridge is made of a material that provides for an expansion of the outside diameter of the side wall of the top boot when the sealing sleeve is inserted into the top boot.

7. A filter cartridge according to claim 6 wherein said sealing ridge is a spring.

8. A filter cartridge according to claim 6 wherein said sealing ridge is made of urethane, molded rubber or silicone.

9. A filter cartridge according to claim 3 wherein the sealing sleeve includes a tapered section that assists in expanding the sealing ridge.

10. A filter cartridge according to claim 1 wherein said sealing sleeve has an outside diameter that is larger than the inside diameter of the sealing ridge.

11. A filter cartridge according to claim 10 wherein sealing sleeve has a locking recessed groove located on the outer wall of the sealing sleeve.

* * * * *